(12) United States Patent
Koda et al.

(10) Patent No.: US 11,015,449 B2
(45) Date of Patent: May 25, 2021

(54) STEAM TURBINE BLADE AND STEAM TURBINE

(71) Applicant: MITSUBISHI HEAVY INDUSTRIES COMPRESSOR CORPORATION, Tokyo (JP)

(72) Inventors: Takuro Koda, Hiroshima (JP); Yuichi Sasaki, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 56 days.

(21) Appl. No.: 16/702,836

(22) Filed: Dec. 4, 2019

(65) Prior Publication Data

US 2020/0182063 A1 Jun. 11, 2020

(30) Foreign Application Priority Data

Dec. 7, 2018 (JP) .............................. JP2018-230202

(51) Int. Cl.
| | | |
|---|---|---|
| *F01D 1/16* | (2006.01) | |
| *F01D 5/14* | (2006.01) | |
| *F01D 9/04* | (2006.01) | |

(52) U.S. Cl.
CPC .............. *F01D 5/141* (2013.01); *F01D 9/041* (2013.01); *F05D 2220/31* (2013.01); *F05D 2240/12* (2013.01)

(58) Field of Classification Search
CPC .......... F01D 1/16; F01D 5/142; F01D 17/162; F01D 9/041; F05D 2220/31
See application file for complete search history.

(56) References Cited

U.S. PATENT DOCUMENTS

| | | | | |
|---|---|---|---|---|
| 5,277,549 A | * | 1/1994 | Chen ....................... | F01D 5/141 |
| | | | | 415/181 |
| 6,332,754 B1 | * | 12/2001 | Matsuda ................... | F01D 1/04 |
| | | | | 415/191 |
| 2006/0222490 A1 | | 10/2006 | Senoo et al. | |
| 2018/0038230 A1 | * | 2/2018 | Koda ....................... | F01D 5/142 |

FOREIGN PATENT DOCUMENTS

| | | | | |
|---|---|---|---|---|
| EP | 1260674 A1 | | 11/2002 | |
| EP | 2412922 A1 | | 2/2012 | |
| EP | 3249157 A1 | * | 11/2017 | .......... F01D 17/162 |
| EP | 3249157 A1 | | 11/2017 | |
| JP | 3238267 B2 | | 12/2001 | |
| JP | 2011-074804 A | | 4/2011 | |
| JP | 4869974 B2 | | 2/2012 | |
| WO | 2016-135832 A1 | | 9/2016 | |

* cited by examiner

*Primary Examiner* — Woody A Lee, Jr.
*Assistant Examiner* — Maxime M Adjagbe
(74) *Attorney, Agent, or Firm* — Osha Bergman Watanabe & Burton LLP

(57) ABSTRACT

The present invention provides a steam turbine blade and a steam turbine capable of further improving efficiency. A steam turbine blade includes a proximal end portion T11 which is formed in a blade shape having an intermediate reaction degree, an intermediate portion T12 which is formed in a blade shape having a low reaction degree; and a distal end portion T13 which is formed in a blade shape having a high reaction degree.

4 Claims, 5 Drawing Sheets

STEAM TURBINE BLADE AND STEAM TURBINE

BACKGROUND OF THE INVENTION

Field of the Invention

The present invention relates to a steam turbine blade and a steam turbine.

Priority is claimed on Japanese Patent Application No. 2018-230202, filed on Dec. 7, 2018, the content of which is incorporated herein by reference.

Description of Related Art

A steam turbine includes a rotor which rotates about an axis and a casing which covers the rotor. The rotor has a rotor shaft which extends in an axial direction about an axis and a plurality of rotor blade rows which are fixed to an outer periphery of the rotor shaft and are arranged in the axial direction. Moreover, the steam turbine has a stator vane row which is fixed to an inner periphery of the casing and is disposed on an upstream side of each of the plurality of rotor blade rows. In general, a set of the rotor blade row and the stator vane row adjacent to an upstream side of the rotor blade row is referred to as a stage.

In a steam turbine described in Japanese Patent No. 3238267 below, a control stage which is the most upstream stage is an impulse stage, and all stages on a downstream side of the control stage are reaction stages. A rotor blade row of each reaction stage is fixed to an outer periphery of a drum type rotor shaft. The entire drum-type rotor shaft is a rotor shaft having a cylindrical shape which is long in an axial direction. The reaction stage is a stage which increases a flow velocity of steam while decreasing a steam pressure in the rotor blade rows constituting the reaction stage and applies a rotational force to the rotor blade row by a reaction of the steam.

SUMMARY OF THE INVENTION

In the reaction stage, there is a possibility that a pressure distribution and a flow distribution of the steam passing through the reaction stage may be omnipresent radially outside. In other words, the pressure of the steam on a proximal end portion side decreases. As a result, there is a possibility that efficiency of the steam turbine may be limited.

The present invention provides a steam turbine blade and a steam turbine capable of further improving efficiency.

According to a first aspect of the present invention, there is provided a steam turbine blade including: a proximal end portion which is formed in a blade shape having an intermediate reaction degree; an intermediate portion which is formed in a blade shape having a low reaction degree; and a distal end portion which is formed in a blade shape having a high reaction degree.

According to this configuration, the blade shape of the proximal end portion is set such that a reaction degree of the blade shape is smaller than a reaction angle of the distal end portion and is larger than a reaction angle of the intermediate portion. Thereby, a pressure distribution and a flow distribution of steam can be pressed to the proximal end portion side.

According to a second aspect of the present invention, there is provided a steam turbine including: the steam turbine blade which is provided as a final stage rotor blade; a final stage stator vane which is disposed to be arranged on an upstream side of the steam turbine blade and constitutes a final stage along with the steam turbine blade; an intermediate stage rotor blade which is disposed to be arranged on an upstream side of the final stage stator vane; an intermediate stage stator vane which is disposed to be arranged on an upstream side of the intermediate stage rotor blade, and constitutes an intermediate stage, which is provided to be arranged on an upstream side of the final stage in an axial direction, along with the intermediate stage rotor blade, in which the steam turbine blade has a blade shape of which a pitch/chord ratio is smaller than that of the intermediate stage rotor blade in all of the proximal end portion, the intermediate portion, and the distal end portion.

In the steam turbine according to a third aspect of the present invention, the steam turbine blade may have a blade shape of which a turning angle is smaller than that of the intermediate stage rotor blade in all of the proximal end portion, the intermediate portion, and the distal end portion.

In the steam turbine according to a fourth aspect of the present invention, the final stage stator vane may have a blade shape of which a pitch/chord ratio is smaller than that of the intermediate stage stator vane.

According to the present invention, it is possible to provide the steam turbine blade and the steam turbine capable of further improving the efficiency.

DETAILED DESCRIPTION OF THE INVENTION

Figure 1:
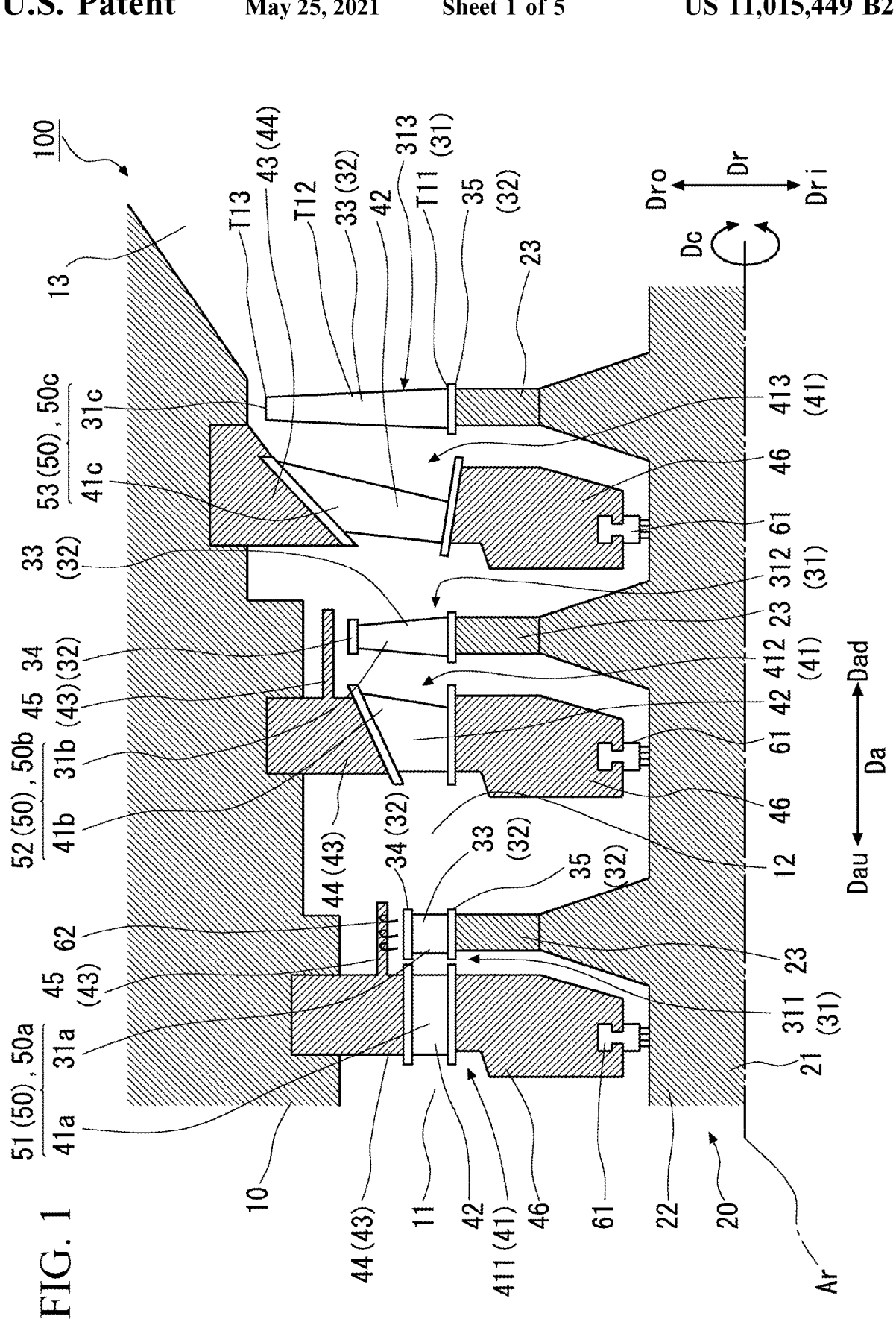
FIG. 1 is a cross-sectional view showing a steam turbine according to an embodiment of the present invention.

As shown in FIG. 1, a steam turbine 100 according to the present embodiment includes a casing 10 and a rotor 20. The casing 10 covers the rotor 20 so that the rotor 20 is rotatable. The rotor 20 is rotatable about an axis Ar.

For convenience of the following descriptions, the direction in which the axis Ar extends is referred to as an axial direction Da, one side in the axial direction Da is referred to as an upstream side Dau, and the other side in the axial direction Da is referred to as a downstream side Dad. In addition, a radial direction with reference to the axis Ar is simply referred to as a radial direction Dr, a side closer to the axis Ar in the radial direction Dr is referred to as a radially inner side Dri, and a side opposite to the radially inner side Dri in the radial direction Dr is referred to as a radially outer side Dro. In addition, a circumferential direction about the axis Ar is simply referred to as a circumferential direction Dc.

The rotor 20 includes a rotor shaft 21 which extends in the axial direction Da about the axis Ar, and a plurality of rotor blade rows 31 which are attached to an outer periphery of the rotor shaft 21. The plurality of rotor blade rows 31 are arranged in the axial direction Da. In a case of the present embodiment, the number of the rotor blade rows 31 is three. Therefore, the case of the present embodiment, a first stage rotor blade row 311 to a third stage rotor blade row 313 are provided as the rotor blade rows 31. One rotor blade row 31 has a plurality of rotor blades 32 arranged in the circumferential direction Dc.

In the three rotor blade rows 31, the rotor blade 32 in each of the first stage rotor blade row 311 and a second rotor blade row 312 includes a blade body 33, a shroud 34, a platform 35, and a blade root (not shown). The blade body 33 extends in the radial direction Dr. The shroud 34 is provided on the radially outer side Dro with respect to the blade body 33. The platform 35 is provided on the radially inner side Dri with respect to the blade body 33. The blade root is provided on the radially inner side Dri with respect to the platform 35.

A steam main flow path through which steam S flows between the shroud 34 and the platform 35 is formed by the rotor blade 32. Moreover, the third stage rotor blade row 313 does not have the shroud 34 and has only the blade body 33, the platform 35, and the blade root.

The rotor shaft 21 has an axial core portion 22 and a plurality of partition portions 23. The axial core portion 22 has a substantially columnar shape about the axis Ar. The axial core portion 22 extends in the axial direction Da. The partition portions 23 extend in a radiation direction from the axial core portion 22 and are arranged in the axial direction Da at intervals. The partition portion 23 is provided for each of the plurality of rotor blade rows 31. The blade roots of the plurality of rotor blades 32 constituting the rotor blade row 31 are embedded in an outer peripheral portion of the partition portion 23 in the rotor shaft 21. Accordingly, the rotor blades 32 are fixed to the rotor shaft 21. Therefore, the rotor shaft 21 of the present embodiment is a disk type rotor shaft.

The steam turbine 100 further includes a plurality of stator vane rows 41 which are arranged in the axial direction Da. Each of the plurality of stator vane rows 41 is disposed on the upstream side Dau of the rotor blade row 31. In the case of the present embodiment, the number of the stator vane rows 41 is three which are the same as the number of the rotor blade row 31. Therefore, in the case of the present embodiment, a first stage stator vane row 411 to a third stage stator vane row 413 are provided as the stator vane rows 41.

The stator vane row 41 has a stator vane 42, an outer ring 43, and an inner ring 46. A plurality of the stator vanes 42 are provided to be arranged in the circumferential direction Dc. The outer ring 43 is provided on the radially outer side Dro with respect to the stator vane 42. The outer ring 43 has an annular shape. The outer ring 43 is fixed to an inner peripheral surface of the casing 10. The inner ring 46 is provided on the radially inner side Dri with respect to the stator vane 42. The inner ring 46 has an annular shape. That is, the plurality of stator vanes 42 are disposed between the outer ring 43 and the inner ring 46 and are fixed to the outer ring 43 and the inner ring 46. An annular space between the outer ring 43 and the inner ring 46 forms the steam main flow path through which the steam S flows. In each of the first stage stator vane row 411 and a second stage stator vane row 412, the outer ring 43 has a ring body portion 44 to which the plurality of stator vanes 42 are fixed and a ring protrusion portion 45 which protrudes from the ring body portion 44 to the downstream side Dad. The ring protrusion portion 45 faces the rotor blade row 31 adjacent to the downstream side Dad of the stator vane row 41 with a gap therebetween in the radial direction Dr. In addition, the outer ring 43 of the third stage stator vane row 413 does not have the ring protrusion portion 45 and has only the ring body portion 44.

As shown in FIG. 1, the casing 10 has a nozzle chamber 11 into which the steam S flows from an outside, a steam main channel chamber 12 through which the steam S from the nozzle chamber 11 flows, and an exhaust chamber 13 through which the steam S which has flowed from the steam main channel chamber 12 is discharged. The first stage stator vane row 411 located on the most upstream side Dau of the plurality of stator vane rows 41 is disposed between the nozzle chamber 11 and the steam main channel chamber 12. In other words, an inside of the casing 10 is partitioned into the nozzle chamber 11 and the steam main channel chamber 12 by the first stage stator vane row 411. In the steam main channel chamber 12, all the stator vane rows 41 except for the first stage stator vane row 411 among the plurality of stator vane rows 41, and all of the plurality of rotor blade rows 31 are disposed.

A set of the rotor blade row 31 and the stator vane row 41 adjacent to the upstream side Dau with respect to the rotor blade row 31 forms one stage 50. The stator vane row 41 is provided for each of the three rotor blade rows 31, and thus, the steam turbine of the present embodiment includes three stages 50.

In the steam turbine 100 of the present embodiment, the most upstream first stage 51 of the plurality of stages 50 is a control stage 50a which adjusts a flow rate of the steam S fed to the stages 50 located on the downstream side Dad of the first stage 51 so as to adjust a rotational speed of the rotor 20. In the steam turbine of the present embodiment, the second stage 52 is an intermediate pressure stage 50b (intermediate stage). Moreover, in the steam turbine of the present embodiment, the third stage 53 is a low pressure stage 50c (final stage). Accordingly, the intermediate pressure stage 50b is the stage 50 which is provided to be arranged on the upstream side Dau in the axial direction Da with respect to the low pressure stage 50c. In addition, the intermediate pressure stage 50b is the stage 50 which is provided to be arranged on the downstream side Dad in the axial direction Da with respect to the control stage 50a.

Accordingly, hereinafter, the first stage stator vane row 411 which constitutes a portion of the control stage 50a is referred to as a control stage stator vane row 41a, and the first stage rotor blade row 311 which constitutes another portion of the control stage 50a is referred to as a control stage rotor blade row 31a. Moreover, the second stage stator vane row 412 which constitutes a portion of the intermediate pressure stage 50b is referred to as an intermediate pressure stage stator vane row 41b (intermediate stage stator vane), and the second stage rotor blade row 312 which constitutes another portion of the intermediate pressure stage 50b is referred to as an intermediate pressure stage rotor blade row 31b (intermediate stage rotor blade). Moreover, the third stage stator vane row 413 which constitutes a portion of the low pressure stage 50c is referred to as a low pressure stage stator vane row 41c (final stage stator vane), and the third stage rotor blade row 313 which constitutes another portion of the low pressure stage 50c is referred to as a low pressure stage rotor blade row 31c (final stage rotor blade).

The blade body 33 of each of the plurality of rotor blades 32 which constitute the control stage rotor blade row 31a is a parallel blade. The blade bodies 33 of the plurality of rotor blades 32 which constitute the intermediate pressure stage rotor blade row 31b and the low pressure stage rotor blade row 31c are all twisted blades. The parallel blade is a blade in which a direction of a chord is changed even if a position in the radial direction Dr is changed, in other words, a position is changed in a blade height direction. In addition, the twisted blade is a blade in which a direction of a chord is gradually changed according to a positional change in the radial direction Dr.

An inner seal 61 which seals a portion between the axial core portion 22 of the rotating rotor shaft 21 and the inner ring 46 is provided on the radially inner side Dri of each inner ring 46 of the control stage stator vane row 41a, the intermediate pressure stage stator vane row 41b, and the low pressure stage stator vane row 41c.

An outer seal 62 which seals a portion between the ring protrusion portion 45 and the rotor blade row 31 disposed on the radially inner side Dri of the ring protrusion portion 45 is provided in the ring protrusion portion 45 of the control stage stator vane row 41a.

In the present embodiment, the control stage 50a is an impulse stage, and the intermediate pressure stage 50b and the low pressure stage 50c are reaction stages.

Here, a reaction degree will be described. The reaction degree is a ratio of a heat drop in the rotor blade 32 in the stage 50 to a heat drop in the stage 50. In other words, the reaction degree is a ratio of an amount of change in static enthalpy at the rotor blade 32 in an amount of change in total enthalpy per stage 50. Alternatively, the reaction degree is a ratio of a pressure difference in the rotor blade 32 in the stage 50 to a pressure difference in the stage 50.

In a case where the reaction degree is 0, there is no pressure change at the rotor blade 32. In a case where the reaction degree is not 0, a flow velocity of the steam at the rotor blade 32 increases while a pressure at the rotor blade 32 decreases. Accordingly, in the case where the reaction degree is not 0, the steam expands while passing through the rotor blade 32. A reaction force generated by this expansion acts on the rotor blade 32. In the case where the reaction degree is 0, only an impulse action of the steam is applied to the rotor blade 32. However, in the case where the reaction degree is not 0, a reaction action is applied to the rotor blade 32 in addition to the impulse action of the steam. Accordingly, as the reaction degree increases, basically, blade performance increases.

As definitions of the impulse stage and the reaction stage, there are various definitions. For example, in a definition, having a stage having a reaction level of 0 is referred to as an impulse stage, and a stage having a reaction level of not 0 is referred to as a reaction stage. However, as the definitions of the impulse stage and the reaction stage, there are other definitions. In the present application, a stage having the reaction degree less than 10% is referred to the impulse stages, and a stage having the reaction degree of 10% or more is referred to as the reaction stage.

In the blade body 33 of the rotor blade 32 in the reaction stage, a region including an end portion of the most radially inner side Dri (a side closer to the platform 35) is referred to as a proximal end portion T11, a region including a half position in the radial direction Dr is referred to as an intermediate portion T12, and a region including an end portion of the most radially outer side Dro (a side close to the shroud when there is the shroud) is referred to as a distal end portion T13. That is, in a case where the blade body 33 in the reaction stage is divided into three equal portions in the radial direction Dr (blade height direction), the proximal end portion T11, the intermediate portion T12, and the distal end portion T13 are arranged in this order from the radially inner side Dri.

The reaction degree at each stage 50 is indicated by the reaction degree at the proximal end portion T11.

In the present embodiment, a shape of the blade body 33 of the rotor blade (steam turbine blade) 32 in each of the intermediate pressure stage rotor blade row 31b and the low pressure stage rotor blade row 31c is set as follows. In the blade body 33 in the reaction stage, the proximal end portion T11 is formed in a blade shape having an intermediate reaction degree. The intermediate portion T12 is formed in a blade shape having a low reaction degree which is smaller than the intermediate reaction degree. The distal end portion T13 is formed in a blade shape having a high reaction degree which is greater than the intermediate reaction degree.

Specifically, the low reaction degree in the present embodiment is a value which is lower than the intermediate reaction degree in the one blade body 33 described above, and for example, the reaction degree is preferably less than 15%. Therefore, in the intermediate portion T12, the reaction degree is preferably 5% or more and less than 15%, and more preferably 5% or more and 10 or less.

In addition, the intermediate reaction degree in the present embodiment is a value which is higher than the low reaction degree and lower than the high reaction degree in the one blade body 33 described above. As the intermediate reaction degree, for example, the reaction degree is preferably 10% or more and less than 40%. Therefore, in the proximal end portion T11, the reaction degree is preferably 10% or more and 30% or less, and more preferably 15% or more and 20% or less.

Moreover, the high reaction degree in the present embodiment is a value which is higher than the intermediate reaction degree in the one blade body 33 described above, and for example, the reaction degree is preferably 40% or more and less than 70%. Accordingly, for example, in the distal end portion T13, the reaction degree is preferably 40% or more and 60% or less, and more preferably 50% or more and 60% or less.

Figure 2:
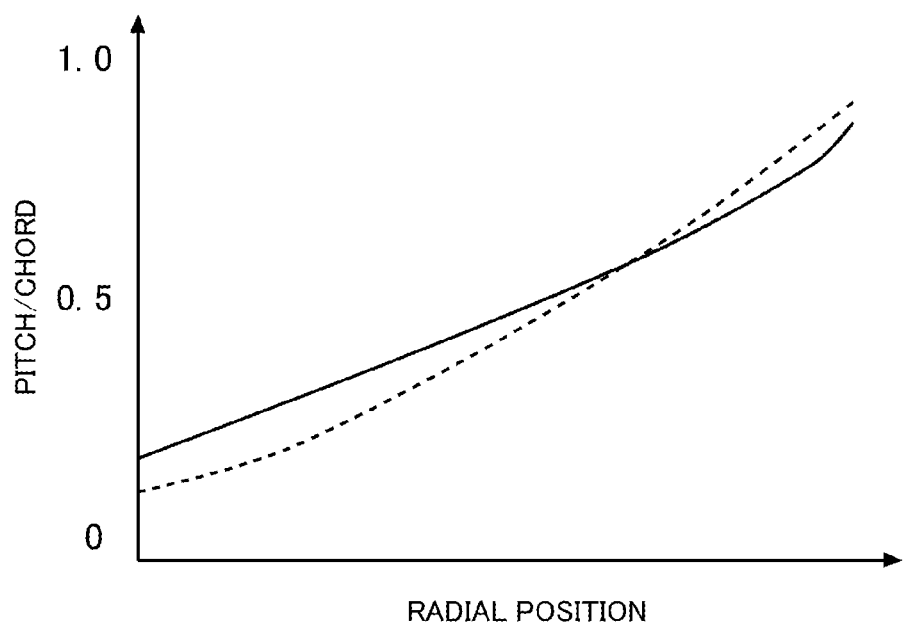
FIG. 2 is a graph showing a relationship between a radial position and a pitch/chord ratio in a final stage rotor blade of the steam turbine according to the embodiment of the present invention.
Figure 6:
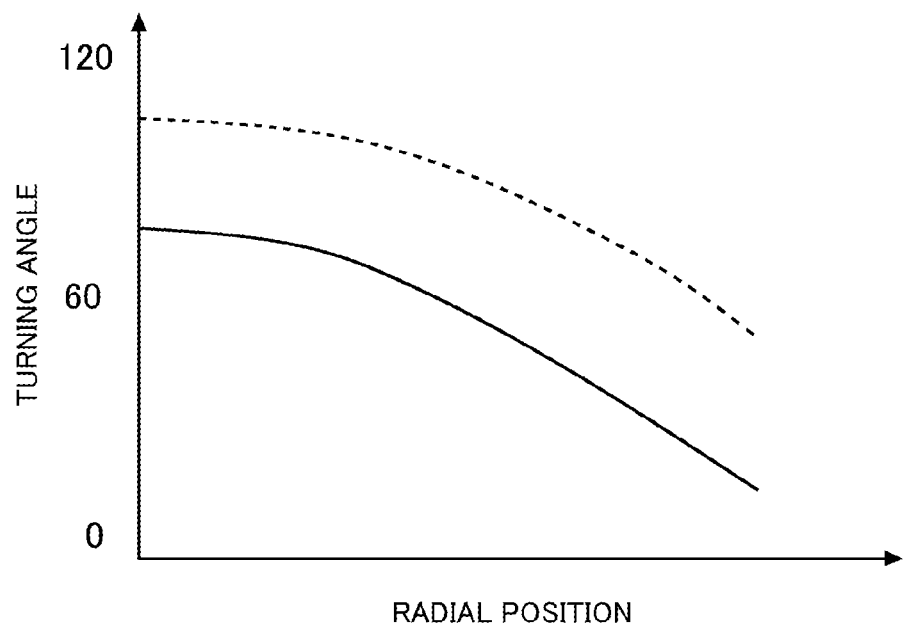
FIG. 6 is a graph showing a relationship between the radial position and a turning angle in the final stage rotor blade of the steam turbine according to the embodiment of the present invention.

More specifically, a distribution of the above-described reaction degrees is realized by a pitch/chord ratio of a blade cross section being distributed as shown in FIG. 2 and a turning angle being distributed as shown in FIG. 6 in the radial direction Dr of the rotor blade 32 in the low pressure stage rotor blade row 31c. First, the distribution of the pitch/chord ratio will be described with reference to FIG. 2. In an example of FIG. 2, the pitch/chord ratio gradually increases from the end portion (proximal end portion T11) on the radially inner side Dri to the end portion (distal end portion T13) on the radially outer side Dro, and is distributed in a curved shape protruding downward. In addition, a broken line in FIG. 2 is a curve showing a distribution of a pitch/chord ratio of a general rotor blade of the related art.

Here, the pitch/chord ratio is a ratio of a spacing (pitch) between adjacent blades to the chord length of each blade.

Figure 4:
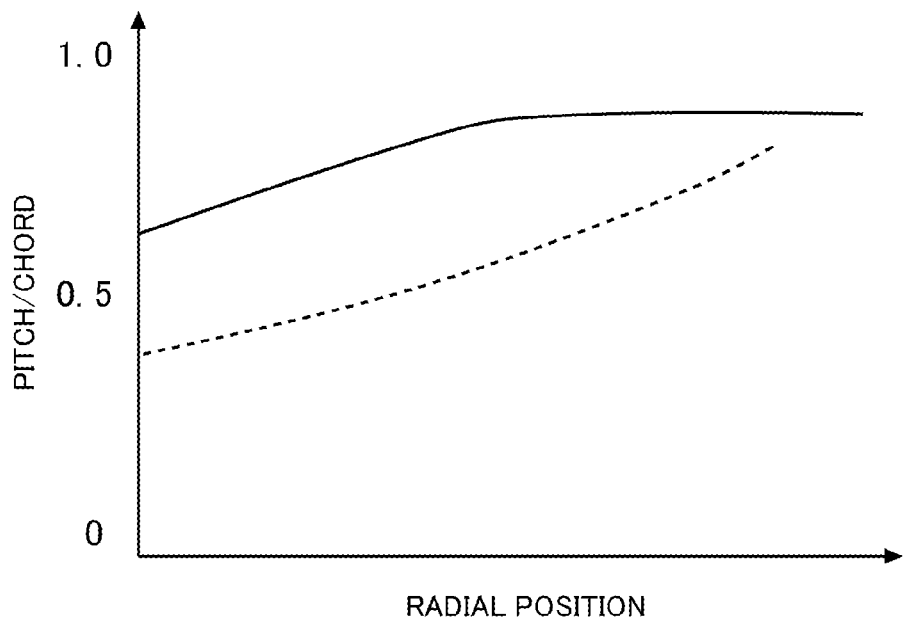
FIG. 4 is a graph showing a relationship between a radial position and a pitch/chord ratio in an intermediate stage rotor blade of the steam turbine according to the embodiment of the present invention.

Further, the entire rotor blade 32 in the low pressure stage rotor blade row 31c has a blade shape whose pitch/chord ratio is smaller than the pitch/chord ratio of the rotor blade 32 in the intermediate pressure stage rotor blade row 31b. More specifically, a distribution of the pitch/chord ratio of the rotor blade 32 in the intermediate pressure stage rotor blade row 31b is set as shown in FIG. 4. By comparing FIG. 2 and FIG. 4 with each other, it can be seen that the rotor blade 32 in the low pressure stage rotor blade row 31c has a smaller pitch/chord ratio value over the entire region in the radial direction Dr. In addition, a broken line in FIG. 4 is a curve showing a distribution of the pitch/chord ratio of the general rotor blade of the related art.

Figure 3:
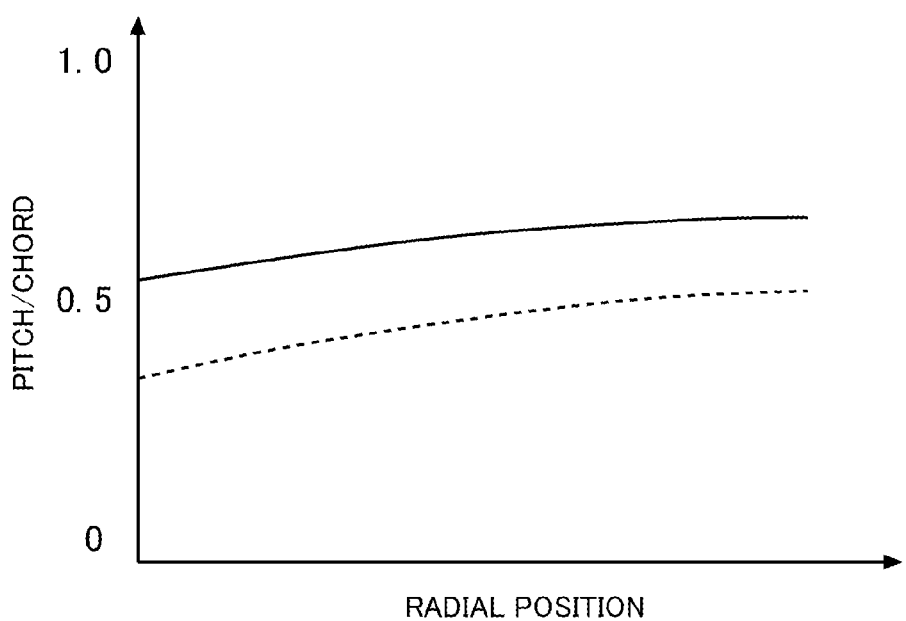
FIG. 3 is a graph showing a relationship between a radial position and a pitch/chord ratio in a final stage stator vane of the steam turbine according to the embodiment of the present invention.

Moreover, the stator vane 42 in the low pressure stage stator vane row 41c has a distribution of a pitch/chord ratio as shown in FIG. 3. In an example of FIG. 3, the pitch/chord ratio is constant at about 0.5 in the entire radial direction Dr. Moreover, a broken line in FIG. 3 is a curve showing a distribution of a pitch/chord ratio of a general stator vane of the related art.

Figure 5:
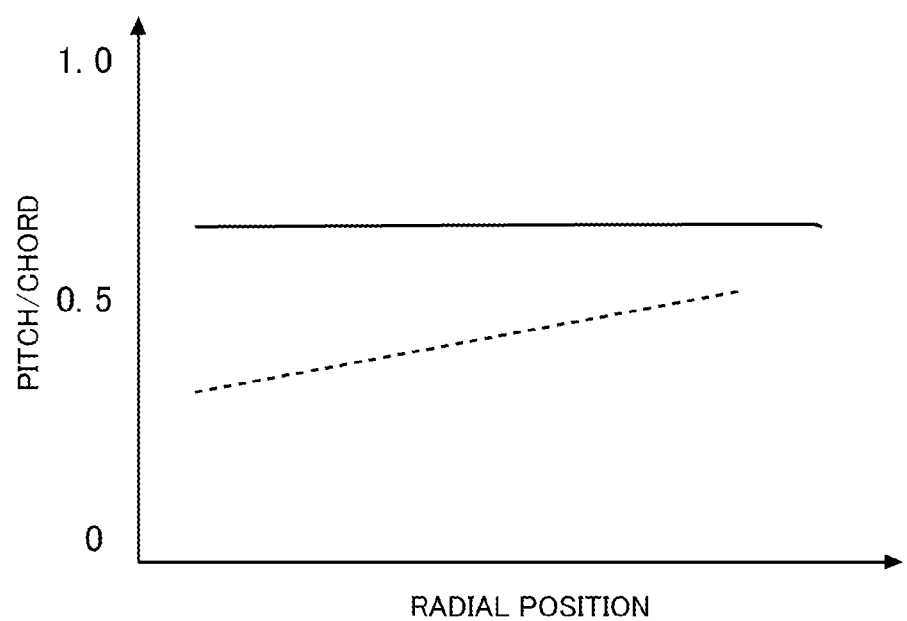
FIG. 5 is a graph showing a relationship between a radial position and a pitch/chord ratio in an intermediate stage stator vane of the steam turbine according to the embodiment of the present invention.

In addition, the entire stator vane 42 in the low pressure stage stator vane row 41c has a blade shape whose pitch/chord ratio is smaller than the pitch/chord ratio of the stator vane 42 in the intermediate pressure stage stator vane row 41b. More specifically, the distribution of the pitch/chord ratio of the stator vane 42 in the intermediate pressure stage stator vane row 41b is set as shown in FIG. 5. By comparing FIG. 3 and FIG. 5 with each other, it can be seen that the stator vane 42 in the intermediate pressure stage stator vane row 41b has a smaller pitch/chord ratio value over the entire region in the radial direction Dr. In addition, a broken line in FIG. 5 is a curve showing a distribution of the pitch/chord ratio of the general rotor blade of the related art.

Moreover, the rotor blade 32 in the low pressure stage rotor blade row 31c has a distribution of a turning angle as shown in FIG. 6. Specifically, in the rotor blade 32, the turning angle gradually decreases from the radially inner side Dri toward the radially outer side Dro and is distributed in a curved shape protruding upward. In addition, a broken line in FIG. 6 is a curve showing a distribution of a turning angle of the general rotor blade of the related art. Here, the turning angle indicates a difference in an angle (a difference between an inflow angle and an outflow angle) formed by a direction in which the chord extends with respect to the axial direction Da on a front edge side and a rear edge side.

Figure 7:
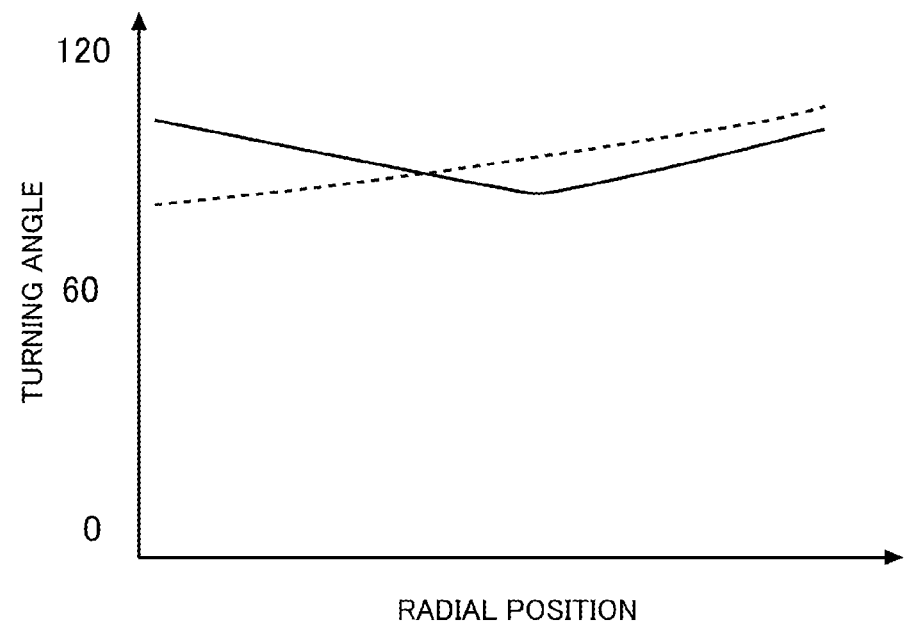
FIG. 7 is a graph showing a relationship between the radial position and a turning angle in the final stage stator vane of the steam turbine according to the embodiment of the present invention.

The stator vane 42 in the low pressure stage stator vane row 41c has a distribution of a turning angle as shown in FIG. 7. Specifically, in the stator vane 42, the turning angle is smallest at a center portion from the radially inner side Dri to the radially outer side Dro. Moreover, a turning angle on an end portion on the radially inner side Dri is slighter larger than that on an end portion on the radially outer side Dro. In addition, a broken line in FIG. 7 is a curve showing a distribution of a turning angle of the general stator vane of the related art.

Figure 8:
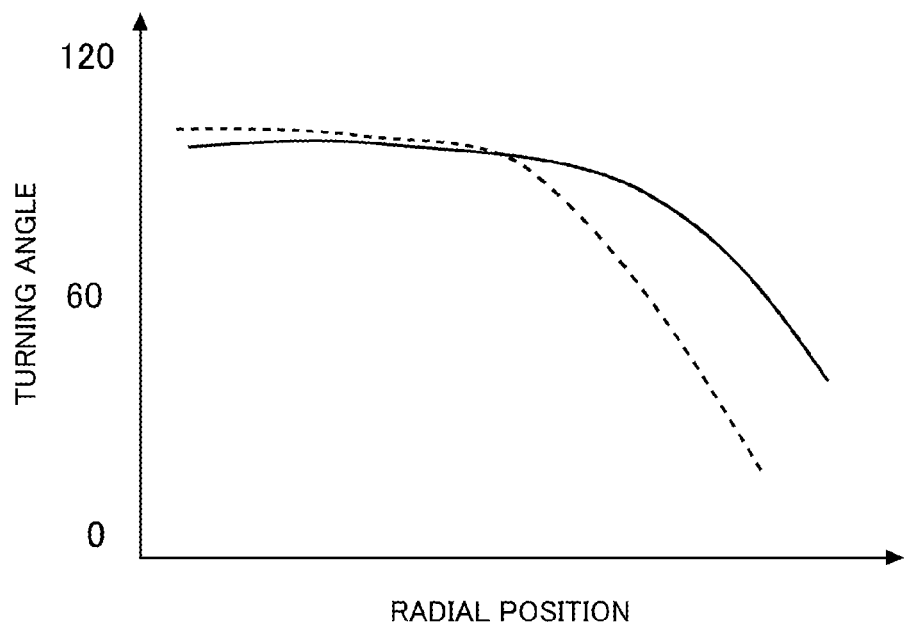
FIG. 8 is a graph showing a relationship between the radial position and a turning angle in the intermediate stage rotor blade of the steam turbine according to the embodiment of the present invention.

The rotor blade 32 in the intermediate pressure stage rotor blade row 31b has a distribution of a turning angle as shown in FIG. 8. Specifically, in the rotor blade 32, a turning angle of a region including the end portion on the radially outer side Dro is smaller than those of other regions. In addition, a broken line in FIG. 8 is a curve showing the distribution of the turning angle of the general rotor blade of the related art.

Figure 9:
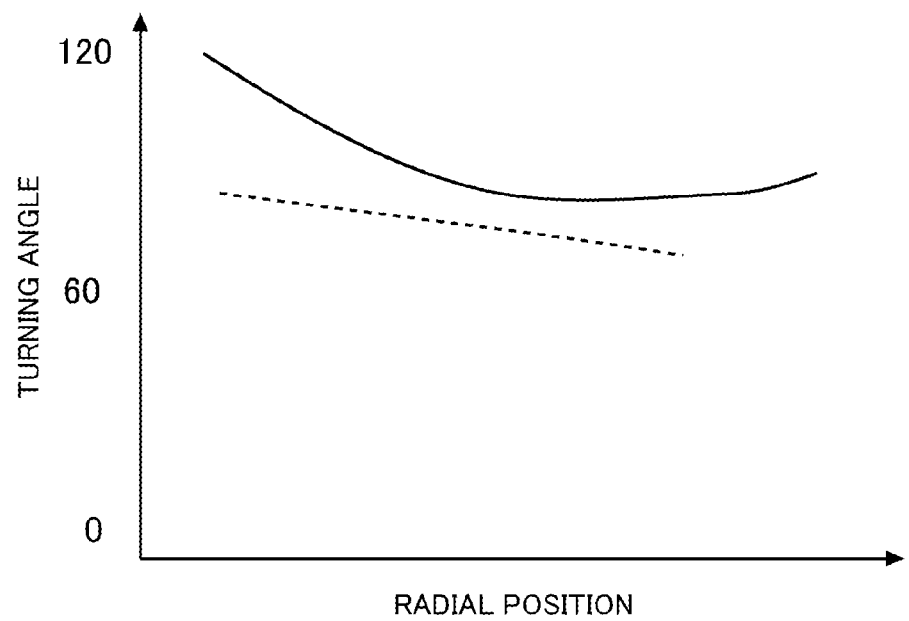
FIG. 9 is a graph showing a relationship between the radial position and a turning angle in the intermediate stage stator vane of the steam turbine according to the embodiment of the present invention.

The stator vane 42 in the intermediate pressure stage stator vane row 41b has a distribution of a turning angle as shown in FIG. 9. Specifically, in the stator vane 42, the turning angle is smallest at a center portion from the radially inner side Dri to the radially outer side Dro. Moreover, the turning angle at the end portion on the radially inner side Dri is slightly larger than the turning angle at the end portion on the radially outer side Dro. In addition, a broken line in FIG. 9 is a curve showing the distribution of the turning angle of the general stator vane of the related art.

According to the above-described configuration, the blade shape of the proximal end portion T11 of the rotor blade 32 in the low pressure stage rotor blade row 31c is set such that the reaction degree of the blade shape is smaller than the reaction angle of the distal end portion T13 and is larger than the reaction angle of the intermediate portion T12. Thereby, a pressure distribution and a flow distribution of the steam can be pressed to the proximal end portion T11 side. In the steam turbine 100, the steam collects on the side of the distal end portion T13 due to a centrifugal force generated by the rotation of the rotor blade 32. As a result, especially near the final stage where the pressure is low, the flow rate of the steam of the proximal end portion TI 1 easily decreases. However, in the present embodiment, the reaction degree of the proximal end portion T11 is formed so as to be larger than the reaction degree of the intermediate portion T12. Accordingly, it is possible to increase the flow rate of the steam circulating in the vicinity of the proximal end portion T11. Therefore, it is possible to suppress occurrence of a backflow of the steam in the vicinity of the proximal end portion T11. As a result, a loss due to backflow can be reduced, and it is possible to further improve efficiency of the steam turbine 100.

Moreover, in the low pressure stage rotor blade row 31c and the low pressure stage stator vane row 41c, the pitch/chord ratio and turning angle are set as described above. Accordingly, the pressure distribution and the flow distribution of the steam can be more positively pressed toward the radially inner side Dri.

Other Modifications of Embodiment

Hereinbefore, the embodiment of the present invention is described in detail with reference to the drawings. However, configurations in the embodiment and combinations thereof are examples, and additions, omissions, substitutions, and other modifications of configurations are possible within a scope which does not depart from the gist of the invention. Moreover, the present invention is not limited by the embodiment and is limited only by claims.

For example, the blade body 33 having the blade shape in which the proximal end portion T11 has the intermediate reaction degree, the intermediate portion T12 has the low reaction degree, and the distal end portion T13 has the high reaction degree is not limited to only the blade body 33 of each of the intermediate pressure stage rotor blade row 31b and the low pressure stage rotor blade row 31c. The blade having this shape may be used for the stator vane 42. Therefore, the stator vane 42 in the low pressure stage stator vane row 41c or the intermediate pressure stage stator vane row 41b may be formed to have this blade shape.

Moreover, the number of the reaction stages or the impulse stages is not limited to the number of the present embodiment. For example, the reaction stage may be only one stage 50 or may have three or more stages 50. Further, the impulse stage may have two or more stages 50.

EXPLANATION OF REFERENCES

100: steam turbine
10: casing

11: nozzle chamber
12: steam main channel chamber
13: exhaust chamber
20: rotor
21: rotor shaft
22: axial core portion
23: partition portion
31: rotor blade row
31a: control stage rotor blade row
31b: intermediate pressure stage rotor blade row
31c: low pressure stage rotor blade row
32: rotor blade
41: stator vane row
41a: control stage stator vane row
41b: intermediate pressure stage stator vane row
41c: low pressure stage stator vane row
42: stator vane
43: outer ring
46: inner ring
61: inner seal
62: outer seal
T11: proximal end portion
T12: intermediate portion
T13: distal end portion
311: first rotor blade row
312: second rotor blade row
313: third rotor blade row
411: first stage stator vane row
412: second stage stator vane row
413: third stage stator vane row

What is claimed is:

1. A steam turbine comprising:
a steam turbine blade, provided as a final stage rotor blade, comprising:
   a proximal end portion formed in a blade shape having an intermediate reaction degree;
   an intermediate portion formed in a blade shape having a low reaction degree; and
   a distal end portion formed in a blade shape having a high reaction degree;
a final stage stator vane which is disposed to be arranged on an upstream side with respect to the steam turbine blade and constitutes a final stage along with the steam turbine blade;
an intermediate stage rotor blade which is disposed to be arranged on an upstream side with respect to the final stage stator vane;
an intermediate stage stator vane which is disposed to be arranged on an upstream side with respect to the intermediate stage rotor blade, and constitutes an intermediate stage, which is provided to be arranged on an upstream side with respect to the final stage in an axial direction, along with the intermediate stage rotor blade,
wherein the steam turbine blade has a blade shape of which a pitch/chord ratio is smaller than that of the intermediate stage rotor blade in all of the proximal end portion, the intermediate portion, and the distal end portion.

2. The steam turbine according to claim 1,
wherein the steam turbine blade has a blade shape of which a turning angle is smaller than that of the intermediate stage rotor blade in all of the proximal end portion, the intermediate portion, and the distal end portion.

3. The steam turbine according to claim 1,
wherein the final stage stator vane has a blade shape of which a pitch/chord ratio is smaller than that of the intermediate stage stator vane.

4. The steam turbine according to claim 2,
wherein the final stage stator vane has a blade shape of which a pitch/chord ratio is smaller than that of the intermediate stage stator vane.

* * * * *